United States Patent [19]
Patapoutian et al.

[11] Patent Number: 5,661,760
[45] Date of Patent: Aug. 26, 1997

[54] WIDE BIPHASE DIGITAL SERVO INFORMATION DETECTION, AND ESTIMATION FOR DISK DRIVE USING SERVO VITERBI DETECTOR

[75] Inventors: Ara Patapoutian, Westboro; Matthew P. Vea, Shrewsbury, both of Mass.; Hung C. Nguyen, San Jose, Calif.

[73] Assignee: Quantum Corporation, Milpitas, Calif.

[21] Appl. No.: 686,998

[22] Filed: Jul. 24, 1996

Related U.S. Application Data

[60] Provisional application No. 60/006,013 Oct. 23, 1995.
[51] Int. Cl.$^6$ .............................. H04D 27/06; H03D 1/00
[52] U.S. Cl. .................. 375/341; 371/46; 360/48; 360/77.08
[58] Field of Search ...................... 375/262, 341, 375/355; 371/43, 46; 360/48, 77.08; 341/51

[56] References Cited

U.S. PATENT DOCUMENTS

| | | | |
|---|---|---|---|
| 5,036,408 | 7/1991 | Leis et al. | 360/48 |
| 5,341,387 | 8/1994 | Nguyen | 371/45 |
| 5,345,342 | 9/1994 | Abbott et al. | 360/48 |
| 5,384,671 | 1/1995 | Fisher | 360/51 |
| 5,420,730 | 5/1995 | Moon et al. | 360/77.08 |
| 5,521,945 | 5/1996 | Knudson | 375/341 |
| 5,576,906 | 11/1996 | Fisher et al. | 360/77.08 |

*Primary Examiner*—Stephen Chin
*Assistant Examiner*—Don Vo
*Attorney, Agent, or Firm*—David B. Harrison

[57] ABSTRACT

A synchronous sampling data detection channel includes a data transducer head positioned by a servo-controlled actuator over a recording track of a rotating data storage disk, a preamplifier for receiving electrical analog signals magnetically induced by the data transducer head from flux transitions present in at least the servo information field, a digital sampler for synchronously sampling the electrical analog signals to produce digital samples, and a Viterbi detector coupled to receive digital samples from the synchronous sampling data detection channel for decoding 1/4 T coded wide biphase servo information patterns patterns as maximum likelihood servo data sequences, wherein the wide biphase magnet patterns are arranged e.g. as ++—— magnet patterns for a binary zero information value and ——++ magnet patterns for a binary one information value.

28 Claims, 14 Drawing Sheets

FIG. 6A

A1 ECC(A1) A0 ECC(A0)
A1 ECC(A1) A2 ECC(A2)
A3 ECC(A3) A2 ECC(A2)
A3 ECC(A3) A4 ECC(A4)
A5 ECC(A5) A4 ECC(A4)
A5 ECC(A5) A6 ECC(A6)
A7 ECC(A7) A6 ECC(A6)
A7 ECC(A7) A8 ECC(A8)

↑ radial direction

FIG. 6B

A1 ECC(A1)   A1 ECC(A1)
A2 ECC(A2)   A2 ECC(A2)
A3 ECC(A3)   A3 ECC(A3)
A4 ECC(A4)   A4 ECC(A4)
A5 ECC(A5)   A5 ECC(A5)
A6 ECC(A6)   A6 ECC(A6)
A7 ECC(A7)   A7 ECC(A7)
A8 ECC(A8)   A8 ECC(A8)

↑ radial direction

WIDE BIPHASE DIGITAL SERVO INFORMATION DETECTION, AND ESTIMATION FOR DISK DRIVE USING SERVO VITERBI DETECTOR

CROSS REFERENCE TO RELATED APPLICATIONS

This application claims the benefit of U.S. Provisional Application No. 60/006013 filed Oct. 23, 1995. This application is related to U.S. patent application Ser. No. 08/320, 540 filed Oct. 12, 1994, now U.S. Pat. No. 5,576,906.

FIELD OF THE INVENTION

The present invention relates to apparatus and methods for storing, detecting, and estimating servo information stored on disk drive media, and in particular to apparatus and methods useful with partial response, maximum likelihood detection channels and magnetic disk media.

BACKGROUND OF THE INVENTION

By reading servo information recorded within data tracks on a disk surface, a disk drive head positioner servo system is able to estimate data transducer head position. The recorded servo information typically includes track (i.e. cylinder and head) addresses and servo bursts. Each circumferential data track on a disk surface has a unique track address, which is recorded in servo sectors embedded in the track, and servo burst patterns frequently repeat every two or more tracks. When a disk drive is seeking to a radial track location, the track addresses are used as coarse positioning information to approximately estimate the position of the read head and the servo bursts are used as fine positioning information to position the head precisely on the desired radial location.

At seek time while reading track addresses, the head may be positioned between two adjacent tracks. In this situation, the head may receive a superposition of signals from both tracks. One solution to this ambiguity is to encode the track addresses into Gray-coded addresses so that the encoded addresses of any two adjacent tracks differ from each other by only in a single bit position. With this solution, when the head is reading two tracks, the ambiguity after decoding the address is one track, and an error of one track is acceptable at seek time.

In accordance with one known technique, each data track is divided into plural sectors. Each sector includes a header section, followed by a data section. The header section may typically include a DC erase field, a preamble field, a header synchronization character, a track address field (coarse servo information) and a servo burst field (fine servo information). The data section may typically include another preamble field, a data synchronization character, a block of user data, and error correction bytes. In this example, the header section is recorded at the same data rate as the data section, and synchronous peak detection through a single read channel structure in the disk drive is employed to read the information in both the header section and the data section. An example of this approach is found in commonly assigned U.S. Pat. No. 5,036,408 to Leis et at., entitled: "High Efficiency Disk Format and Synchronization System", the disclosure thereof being incorporated herein by reference.

Another known technique is to employ radial zones or bands of concentric data tracks, each zone having a data transfer rate associated with disk radius of the zone. In this example, data areas are separated by a series of radially extending embedded servo sectors which are factory recorded with servo information at a single data transfer rate. A servo data recovery circuit asynchronously (i.e. without phase lock to incoming servo data) recovers a servo address mark, a track number and fine position information from information read by the data transducer while passing over each sector. The servo recovery circuit is separate from the read channel electronics employed for peak detection of user data information. This example is described in commonly assigned U.S. Pat. No. 5,420,730 to Moon, et at., entitled: "Servo Data Recovery Circuit for Disk Drive Having Digital Embedded Sector Servo", the disclosure thereof being incorporated herein by reference.

One factor which has limited data storage densities in magnetic recording employing peak detection techniques has been intersymbol interference, arising when flux transitions are increasingly close to each other. One technique for increasing flux densities in magnetic recording while still accurately reading recorded data is to employ synchronous sampling data detection. This technique, frequently referred to as "partial response, maximum likelihood" (PRML) signalling, has provided some improved data storage densities, at the expense of increased circuit complexity, including a fast analog to digital conversion process, and channel equalization, either on the analog side or on the digital side of the signal stream, or both. An example of a disk drive employing PRML is given in commonly assigned U.S. Pat. No. 5,345,342, to Abbott et at., entitled: "Disk Drive Using PRML Synchronous Sampling Data Detection and Asynchronous Detection of Sector Servo", the disclosure thereof being incorporated herein by reference. The approach described in this patent enabled special circuitry within the synchronous sampling data detection channel to asynchronously detect track number values in embedded servo sectors recorded at a constant servo data rate whereas the user data rate differed by radial data zone across the recording disk. The servo bursts were read and processed using conventional peak detection, and sample and hold techniques.

An improvement over the asynchronous servo sampling technique taught by the Abbott et al. patent referred to above is found in a later, commonly assigned U.S. Pat. No. 5,384,671 to fisher, entitled: "PRML Sampled Data Channel Synchronous Servo Detector", the disclosure thereof being incorporated herein by reference. In this approach a timing loop of the synchronous sampling data detection system is phase locked to servo information, the servo information including track address and fine position information is synchronously sampled and decoded. In this approach the servo preamble field is recorded as a conventional 1/4T sine wave pattern, which corresponds to a 2T pattern in a peak detection channel (T representing a unit sample cell or interval).

Viterbi detectors are known for use within synchronous sampled data detection channels. One example of a Viterbi detector is provided in commonly assigned U.S. Pat. No. 5,341,387 to Nguyen, entitled: "Viterbi Detector Having Adjustable Detection Thresholds for PRML Class IV Sampling Data Detection", the disclosure thereof being incorporated herein by reference.

While these prior approaches have worked well in their respective times, increasing data storage capacities and data transfer rates per unit size disk have led directly to a hitherto unsolved need for an improved disk drive head servo format, architecture and approach.

SUMMARY OF THE INVENTION WITH OBJECTS

A general object of the present invention is to provide improved and simplified methods, apparatus, and data format for addressing data tracks in a disk drive having a partial response, maximum likelihood synchronous sampled data detection channel.

Another object of the present invention is to provide a servo format and apparatus for a PRML disk drive which does not require separate peak-detection hardware.

A further object of the present invention is to provide a simplified address decoding method and apparatus within a PRML disk drive.

One more object of the present invention is to provide a high efficiency servo address format enabling use of higher code rates, smaller cell times and less redundancy within embedded servo sectors which are synchronously sampled and detected within a PRML disk drive.

In one aspect of the present invention a disk drive includes at least one rotating data storage disk having a major surface defining recording tracks divided into data sectors by narrow servo spokes. Each data sector of a track is recorded with user data encoded in accordance with a code having a predetermined distance and user data code rate. Each servo spoke has at least one servo information field coded in a wide biphase pattern at a servo code rate which is one fourth the user data code rate. In this aspect of the invention, a Synchronous sampling data detection channel includes:

a data transducer head positioned by a servo-controlled actuator over the recording track, a preamplifier for receiving electrical analog signals magnetically induced by the data transducer head from flux transitions present in at least the servo information field, a digital sampler for synchronously sampling the electrical analog signals to produce digital samples, and a Viterbi detector coupled to receive digital samples from the synchronous sampling data detection channel for decoding the coded wide biphase pattern as a maximum likelihood servo data sequence.

The Viterbi detector may comprise a difference metric detector or a tree-search detector.

The synchronous sampling data detection channel may include a finite impulse response filter adjusted to a partial response, class IV, target spectrum and in this example, the Viterbi detector is connected to receive equalized digital samples from an output of the finite impulse response filter.

Alternatively, the synchronous sampling data detection channel may include a finite impulse response filter for filtering digital samples in accordance with a 1-D² pulse response (partial response, class IV) where D represents a one bit cell delay, and a 1+D filter connected downstream of the finite impulse response filter in order to provide digital samples filtered in accordance with a 1+D-D²-D³ pulse response (EPR4). In this example the Viterbi detector is connected to receive EPR4 equalized wide biphase samples from an output of the 1+D filter.

The wide biphase magnet patterns as recorded in the plural servo information fields may be arranged as ++-- magnet patterns for a binary zero information value and --++ magnet patterns for a binary one information value.

Plural servo information fields may be provided within each servo spoke, and one of the fields may comprise a servo address mark pattern, such as a nine-symbol word 000100101 (binary) for marking the beginning of a servo information block. At least one servo information field may comprise a Gray coded track number binary pattern of predetermined bit length. This pattern is first decoded as a wide biphase code and then it is decoded as a Gray code. The track number binary pattern may include a parity symbol, and in this case the channel may include circuitry for receiving and decoding the track number binary pattern and checking the parity symbol.

In a related aspect of the invention, the servo information field may comprise two track number binary patterns of predetermined bit length, there being a first track number address of the track, and a second track number address of a track located adjacent to the track. In one preferred format, the second track number is recorded with a one-half track offset extending into the second track. As a further related aspect of the invention, one servo information field may further comprise an error correction code field holding error correction values calculated with respect to the first and second track numbers, and in this arrangement, the channel includes error correction code decoding and correcting circuitry for decoding, checking and correcting the decoded values of the first and second track numbers.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 6A illustrates a first servo sector layout for track numbers without radial interference.

FIG. 6B illustrates a second servo sector layout for track numbers without radial interference.

DETAILED DESCRIPTION OF PREFERRED EMBODIMENTS

Figure 1:
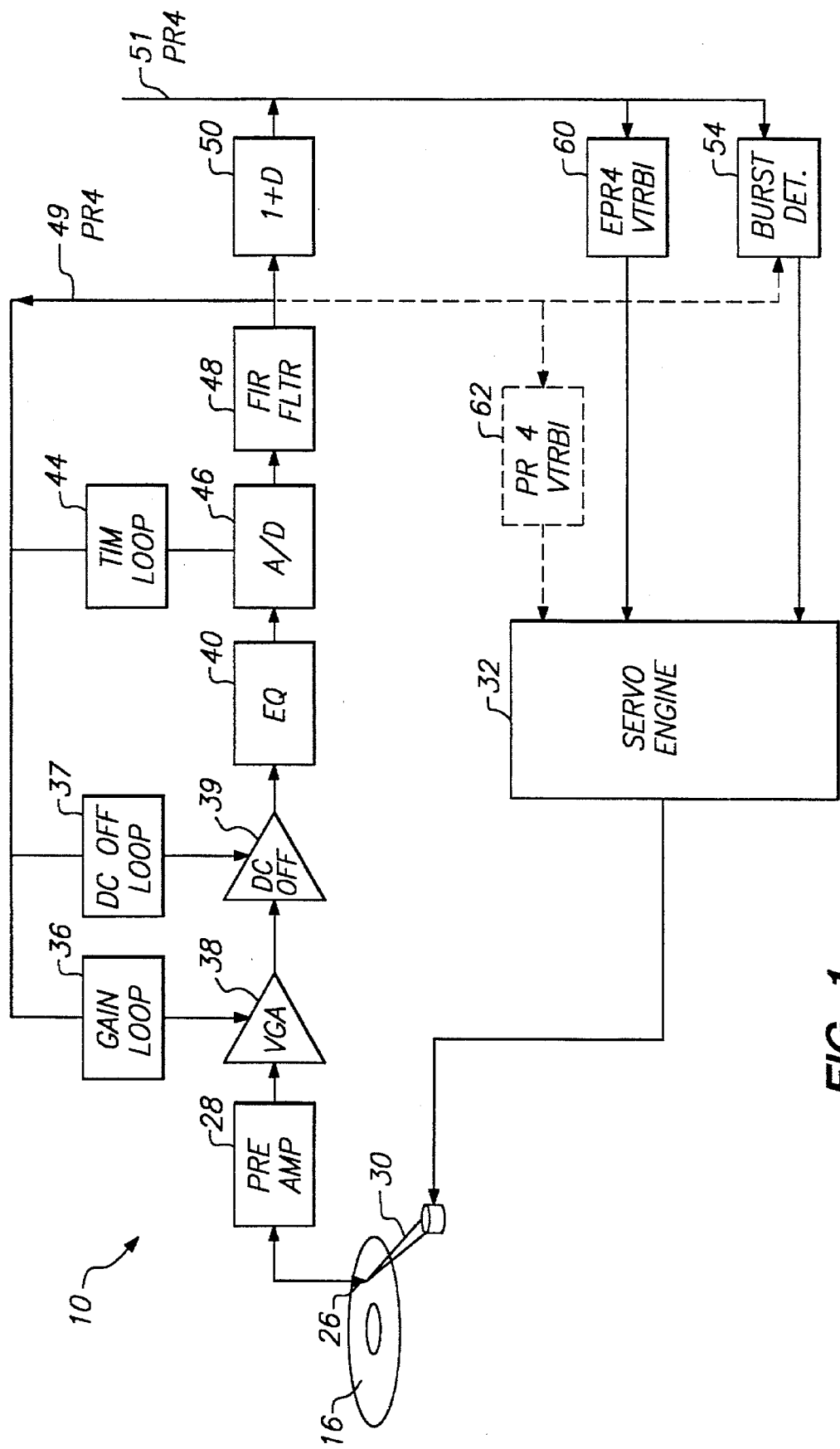
FIG. 1 is a block diagram of a disk drive read channel providing PR4 and EPR4 targets.

Turning to FIG. 1, a disk drive 10 incorporates a programmable and adaptive PR4,ML read channel. The disk drive 10 may be one of a variety of embodiments, such as that disclosed in commonly assigned U.S. Pat. No. 5,341, 249 to Abbott et al., entitled: "Disk Drive Using PRML Class IV Sampling Data Detection with Digital Adaptive Equalization", the disclosure thereof being incorporated herein by reference. (This patent is the parent of the Abbott et al. U.S. Pat. No. 5,345,342, referenced hereinabove.)

The drive 10 includes at least one data storage disk 16. As is conventional, a data transducer head 26, for example, a magneto-resistive head, is associated in a "flying" relationship over a disk surface of each disk 16. The head 26 is positioned relative to selected ones of a multiplicity of concentric data storage tracks 71 defined on each storage surface of the rotating disk 16, see FIG. 2.

Figure 2:
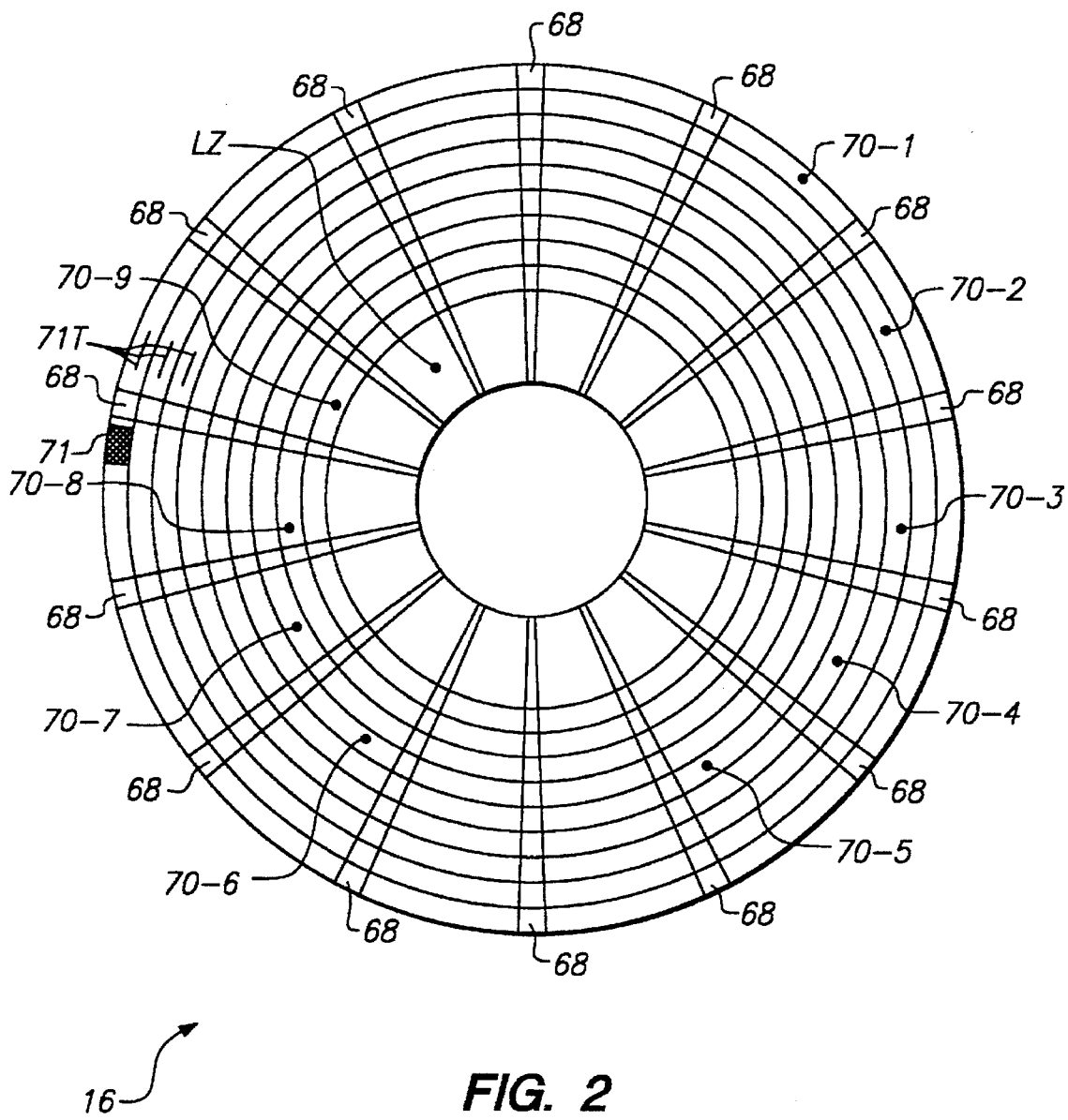
FIG. 2 is a schematic diagram of a recording surface of a disk in the disk drive.

Embedded servo patterns are written by a servo writer on selected data storage surfaces of the disk 16, see FIG. 2, for example, in accordance with the methods described in a commonly assigned U.S. Pat. No. 5,170,299, the disclosure of which is incorporated here by this reference.

During reading, flux transitions sensed by head 26 as it flies in close proximity over the selected data track 71 are preamplified by a read preamplifier circuit 28. The preamplified analog signal (or "read signal") is then sent into an analog variable gain amplifier (VGA) 38. After controlled amplification, the read signal is then passed through a programmable analog filter/equalizer stage 40.

The analog filter/equalizer 40 is programmed so that it is optimized for the data transfer rate of the selected data zone 70 from within which the transducer head 26 is reading data. The equalized analog read signal is then subjected to sampling and quantization within a high speed analog to digital (A/D) converter 46 which, when synchronized to user data, generates raw data samples $\{x(k)\}$ of at least five bits resolution.

An adaptive digital FIR filter 48 employs adaptive filter coefficients for filtering and conditioning the raw data samples $\{x(k)\}$ in accordance with the desired PR4 channel response characteristics in order to produce filtered and conditioned samples $\{y(k)\}$. The bandpass filtered and conditioned data samples $\{y(k)\}$ from FIR filter 48 are then passed over a data bus path 49 to a Viterbi detector (not shown), which detects user data with the PR4 target. In those embodiments using both a PR4 and an EPR4 target, the filtered and conditioned samples $\{y(k)\}$ from FIR filter 48 are also passed through a 1+D filter 50, the output path 51 of which provides the signal filtered to EPR4 channel response characteristics. (If only an EPR4 target is desired, FIR filter 48 is programmed with the appropriate coefficients directly, and 1+D filter 50 is not needed.)

A servo engine 32 is also provided within disk drive 10, and it develops head position control and correction values which are applied to control e.g. a rotary voice coil head positioner structure 30, in accordance with decoded wide biphase servo information values, and burst values decoded in accordance with principles of the present invention.

The samples, including raw data samples $\{x(k)\}$ and filtered samples $\{y(k)\}$, are taken at the data sampling rate, which has a clock bit time period T. This time T corresponds to a "bit cell" or, more simply, a "cell", at the sampling rate.

A timing loop 44 may receive e.g. the PR4 target samples on path 49 and synchronize sampling and quantization by the analog to A/D converter 46 at desired sampling locations. Similarly, a gain loop 36 may control the VGA 38 based e.g. on the PR4 target samples on path 49. Timing and gain loops are described in the referenced Abbott et al. U.S. Pat. No. 5,345,342. A DC offset control loop 37 may also be provided to adjust an offset amplifier 93 for DC offset, based on the PR4 target samples. A representative DC offset loop is described in commonly assigned U.S. Pat. No. 5,459,679 to Ziperovich, entitled: "Real-Time DC Offset Control and Associated Method", the disclosure thereof being incorporated herein by reference.

As shown in FIG. 2, an exemplary data storage surface of a storage disk 16 has multiple concentric data tracks 71 which are preferably arranged in a plurality of data recording zones 70 between an inner landing zone area LZ and a radially outermost peripheral data track zone 70-1. In the illustrated example, the data tracks are shown as arranged into e.g. nine data zones including the outermost zone 70-1, and radially inward zones 70-2, 70-3, 70-4, 70-5, 70-6, 70-7, 70-8 and 70-9, for example. In practice, more zones are presently preferred. Each data zone has a bit transfer rate selected to optimize areal transition domain densities for the particular radius of the zone.

Figure 3:
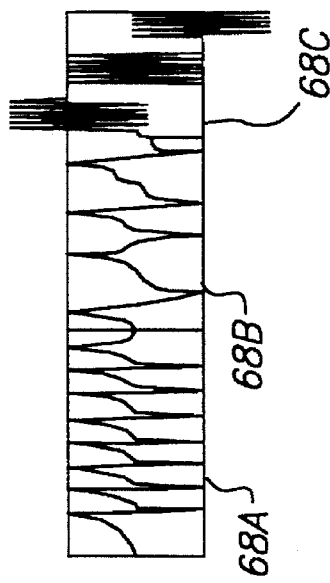
FIG. 3 illustrates a signal recorded on a servo sector on a track of the disk.

FIG. 2 also depicts a series of radially extending embedded servo sectors or "spokes" 68 which e.g. are equally spaced around the circumference of the disk 16. By way of the FIG. 3 overview, each servo sector 68 essentially includes a servo preamble field 68A, a servo identification field 68B, and a field 68C of circumferentially staggered, radially offset servo bursts, for example. While the number of data sectors per track varies from data zone to data zone, the number of embedded servo sectors, e.g. 68 per track, remains constant throughout the surface area of the disk 16, in the present example.

The servo sectors 68 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is incorporated here by this reference. Alternatively, the servo sectors are written at zoned data cell rates, as described in commonly assigned U.S. Pat. No. 5,384,671, already discussed above.

Figure 4:
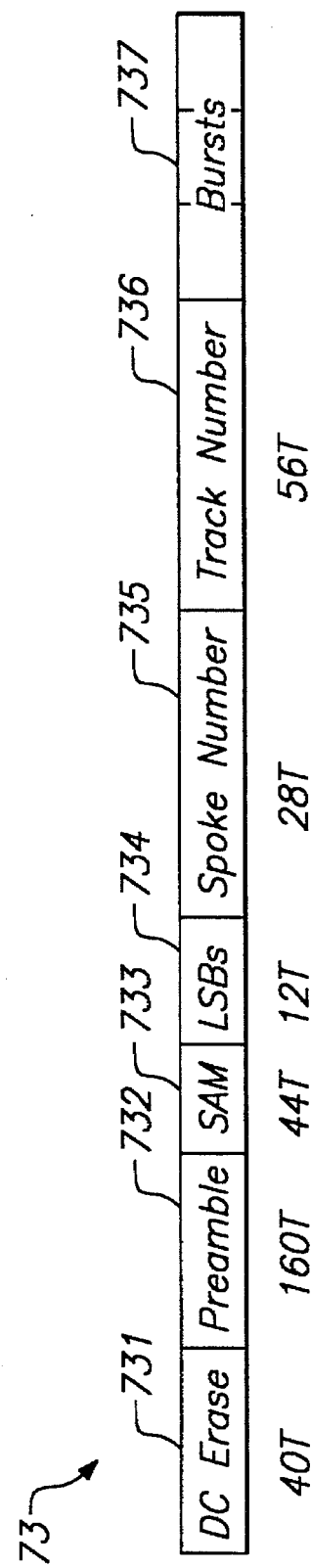
FIG. 4 is a block diagram of the fields of the servo sector.
Figure 5A:
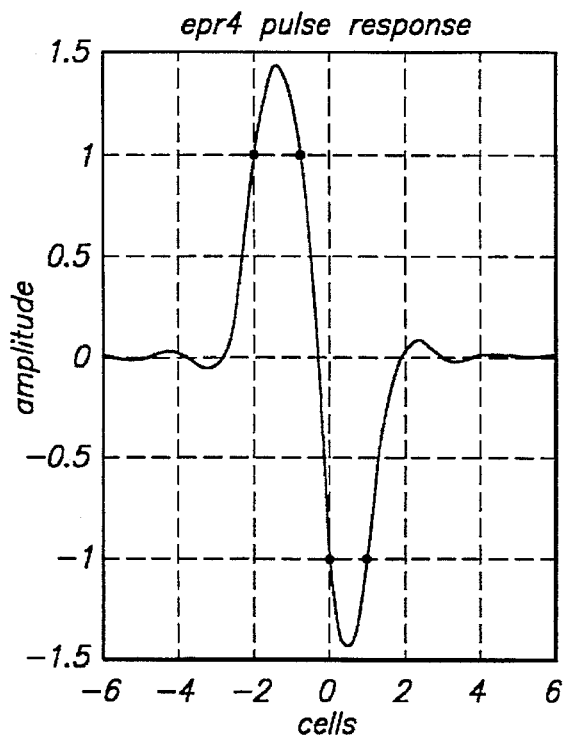
FIG. 5A is a graph of an analog signal response from a magnetic recording of a single write current pulse wherein the channel has been equalized to an EPR4 target spectrum.
Figure 5B:
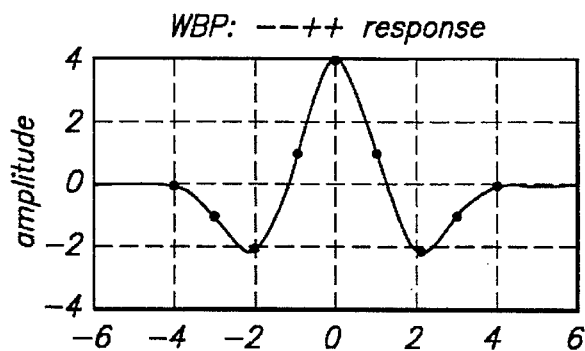
FIG. 5B is a graph of an analog signal response to e.g. a binary one ("--00") wide biphase write current sequence.
Figure 5C:
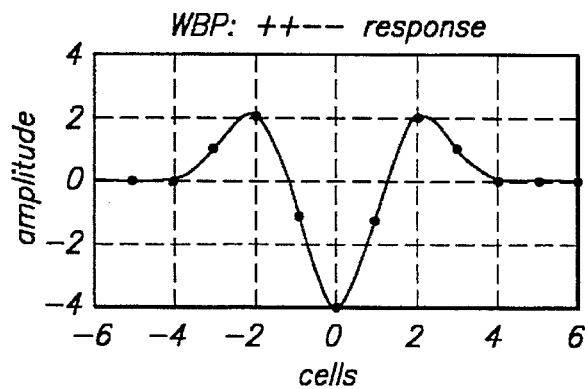
FIG. 5C is a graph of an analog signal response to e.g. a binary zero ("++--") wide biphase write current sequence.
Figure 5D:
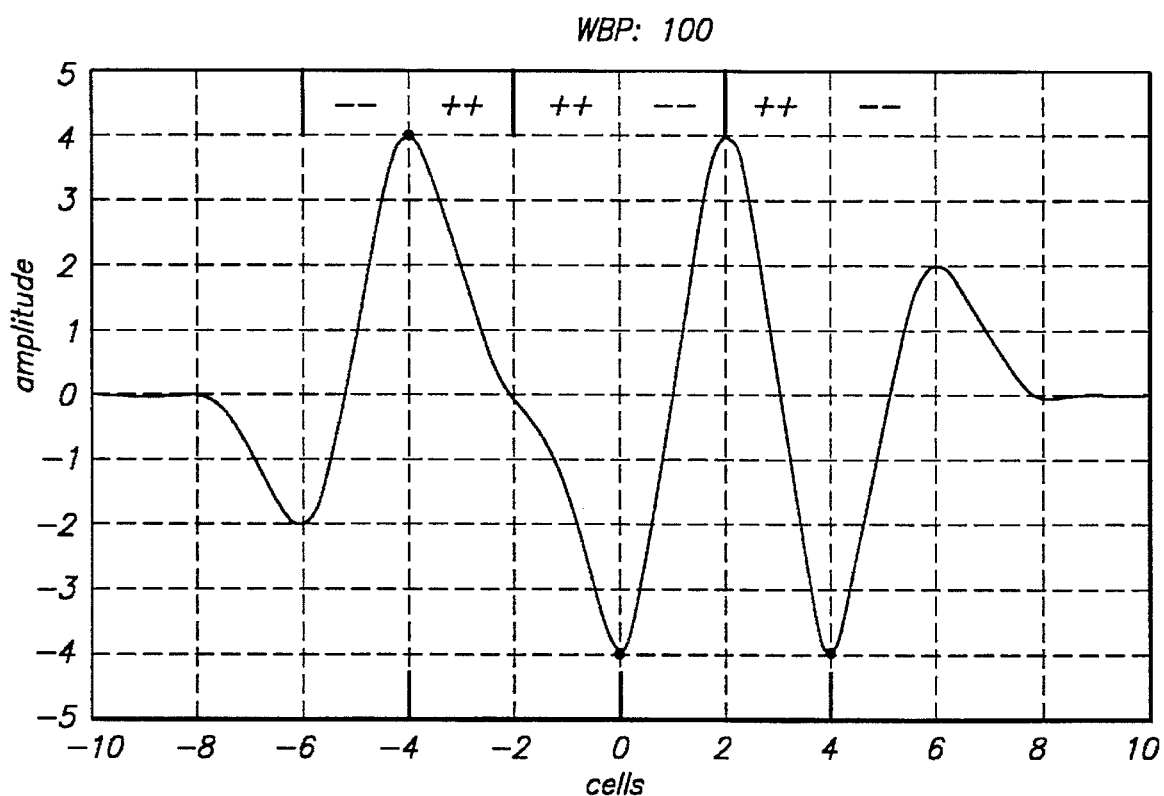
FIG. 5D is a graph of an analog signal response to a wide biphase sequence e.g. a binary 100 sequence ("--++++--++--").

Turning to FIG. 4, each servo sector 68 or "spoke" has a servo identification field of embedded servo information such as is illustrated, for example. A optional DC erase field 731 of size e.g. 40 cells (illustrated in FIG. 4 with the time "40T" below the field) is a clean area on the disk with substantially no or a few transitions, which can be used to flag the onset of a servo sector 68. A preamble field 732 of size e.g. 160 cells can be written in a 2T repeating pattern such as "—++ —++ —++" of the desired length. The preamble 732 is used by timing and gain loops to establish correct gain and phase lock relative to the incoming analog signal thereby to control sampling quantization by the analog to digital converter 46. Together, the optional DC erase field 731 and the preamble field 732 comprise the preamble field 68A of FIG. 3.

A servo address mark 733 is used to reset the framing clock. This is followed by the e.g. three least significant bits (LSBs) 734 of the track number. The full spoke number 735 is optional, although at least one bit of information should be provided to enable rotational position to be determined. The entire track number 736 is recorded at least once. The head number (not shown) may also be recorded as part of the servo addressing information. Together, the servo address mark 733, the LSB field 734, full spoke number field 735 comprise the servo identification field 68B of FIG. 3.

Following the addressing information, servo bursts 737 are recorded, which are used to determine head position with respect to track center, as will be described. Examples of a variety of servo patterns are given hereinafter. These patterns in field 737 correlate to the field 68C of FIG. 3. The lengths of some or all the fields of the servo sector 68 may be of programmable size. Other fields of information may also be recorded among or after the fields that have been described.

We turn now to describe wide bi-phase encoding, which may be used for some or all of the digital data storing fields of servo sector 68, such as the servo address mark 733, LSB field 734, spoke number field 735 and track number field 736, for example. In writing digital data, one begins with an un-coded bit (that is, either a 0 or a 1), which is referred to as a symbol. Symbols are recorded on a disk by a coding that assigns one or more signs or magnets (+ or −) to a cell. (Somewhat ambiguously, the signs may also be referred to as being either 0 or 1.) In bi-phase code, two signs are used, and symbols may be encoded as follows:

1→+−
0→−+

We define a wide bi-phase (WBP) code, with code rate 1/4, as follows:

0→++−−
1→−−++

The DC erase field 731, which should have no flux transitions, cannot be WBP encoded.

The preamble field 732 may be WBP encoded with e.g. 40 or a programmable number of WBP symbols '1' (or cells "−−++"), for PLL and AGC lock.

The servo address mark ("SAM") 733 may be a nine-symbol word '000100101' encoded in WBP that marks the beginning of a servo block. This SAM has the property that all shifts (auto correlation) disagree in at least 5 positions and therefore allows for 2 independent errors without loss of synchronization. When appended to the preamble 732 just described, the sequence looks like '... 1111111000100101'. This is a modified Barker sequence.

The track number 736 may be a 14 symbol address or larger that is first encoded with a normal Gray code (with code-rate=1) and then a parity symbol may be added. The result is WBP encoded. The parity symbol, if any, cannot be used at seek time but can be used at read time to detect single errors. Gray coding is used to avoid large errors when simultaneously reading two adjacent track address when the read head 26 is between tracks at seek time.

In an alternative servo sector layout, track addresses (track numbers) are written twice in each servo sector 68, and the paired track addresses are different from each other. In FIG. 6A, odd track addresses (A1, A3, A5, A7) are written first and even track addresses (A2, A4, A6, A8) are written second, in what appear as radial columns in the figure. In FIG. 6B, the second column records the same track number as does the first, but the second column is recorded with a half-track offset. In both formats, every position of the read head 26 can read an address without interference from an adjacent track in at least one of the two columns. For this reason, Gray coding is not needed and one can append ECC fields to each address, as shown. In the first format (FIG. 6A), the uncertainty is one track; in the second (FIG. 6B), the uncertainty is half a track. In seeking, one may recognize the column to be read by using a position error signal from the servo bursts which have a period of two tracks. For this use, the servo bursts should be positioned close to the track addresses so that the radial position of the read head 26 does not change significantly from the time the head is reading the servo burst and the time it is reading the track addresses.

Viterbi Detectors for WBP Codes with PR4 Targets

Figure 7:
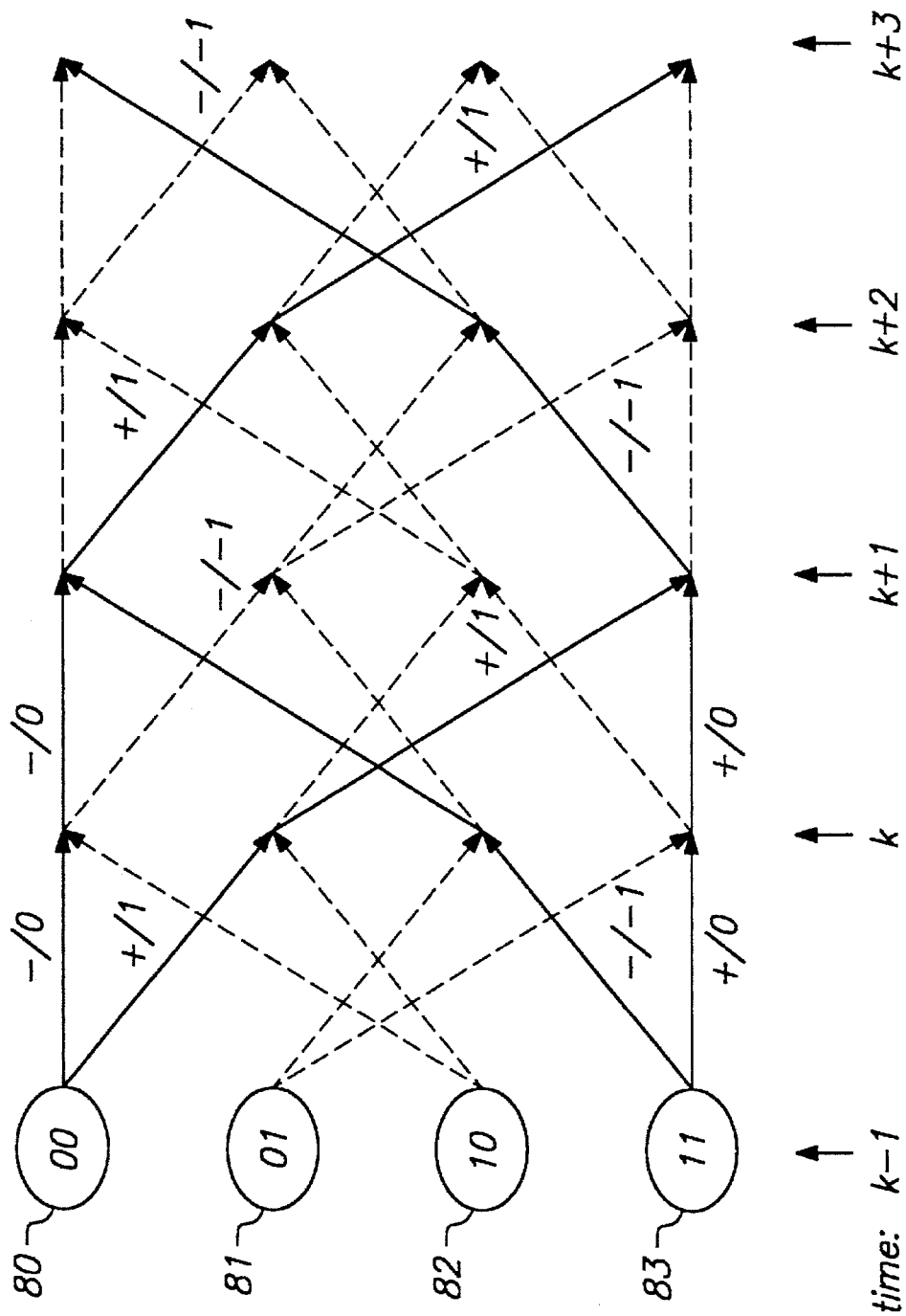
FIG. 7 is trellis diagram of a PR4 channel with wide bi-phase paths highlighted.

The output at path 49 of adaptive FIR filter 48 is a PR4 (class IV partial response) target, which has a pulse response of $1-D^2$, where D represents one bit cell delay. As shown in FIG. 7, the number of states needed to represent the PR4 target is 4. FIG. 7 shows the Viterbi detector trellis diagram of the PR4 target, with solid lines representing the WBP paths and dotted lines representing the non-WBP paths. All paths are valid PR4 paths. On the trellis, each WBP path is marked with a notation in the form '+/w' where the '+' or '−' refers to the magnetization on the disk (what is written in the cell) and the 'w' represents the waveform sample at the Viterbi detector input. FIG. 7 shows 4 time steps of the detector from the initial state at time k−1, where the detection of a WBP encoded symbol begins, to time k+3, where it ends. The magnet '−' is also shown as a '0' and the magnet '+', as a '1'. Thus, for example, state 00 (reference numeral 80) denotes that the previous two cells were read as '−−'.

Turning to the trellis, if the detector is in state 00, reference numeral 80, at time k−1, and the next sample value is 1, the detector goes to state 01, reference numeral 81, at time k. The magnet (or equivalently, the write current) for this branch at time k−1 was '+', a transition from the '−' of state 00, which ideally results in the sample value of 1. Similarly, if the detector is in state 11, reference numeral 83, at time k−1, and the sample value at time k is −1, the detector goes to state 10, reference numeral 82, at time k. The magnet for this branch at time k−1 was '−', a negative transition from the '+' of state 11, which ideally results in the sample value of −1.

Note that since each WBP symbol occupies 4 cells, the detector must be operated knowing where each WBP symbol begins and ends. This 4-cell synchronization will be called chunk synchronization.

Figure 8A:
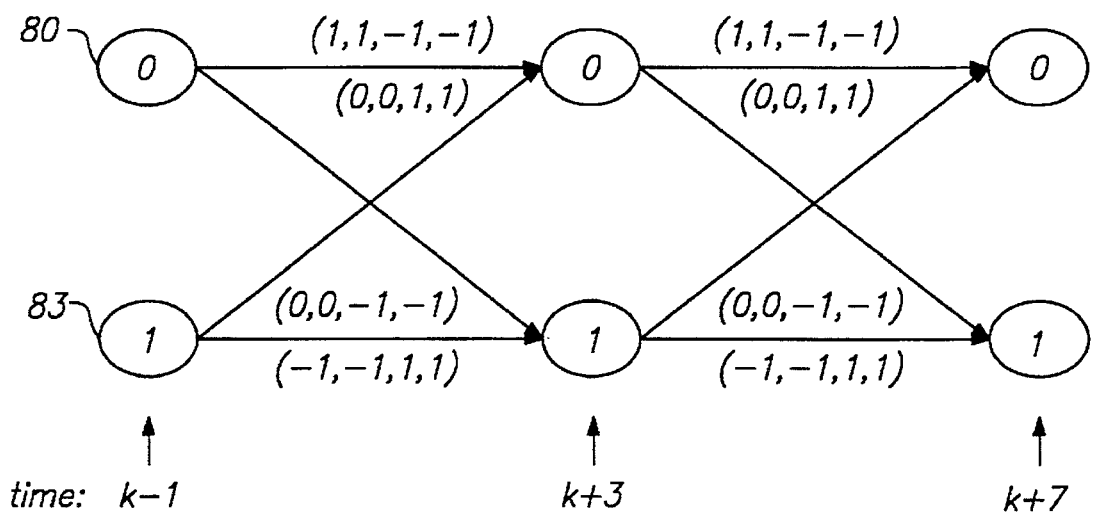
FIG. 8A is a trellis diagram of a wide bi-phase PR4 channel with four samples taken at a time.

Once chunk synchronization is achieved, the trellis can be updated 4 samples at a time, with only two states of the original trellis: 00 and 11. Therefore the 4-state Viterbi detector can be condensed to two states, as shown in FIG. 8A with reference numerals 80 and 83, respectively. In FIG. 8A, only the sample values at the detector input are given with each branch. Note that each sample shown is repeated twice. Thus, the trellis may be simplified by taking the average of every two incoming samples and then processing the resulting stream at half the clock rate. In the simplified trellis, shown in FIG. 8B, the chunks begin at times k−1, k+1, and k+3. (Because of the condensation of states, the time axis k has been scaled by a factor of two.)

A first Viterbi detector, which we will call the difference-metric detector, for WBP codes with PR4 targets will now be described in terms of the states and transitions shown in FIG. 8B.

Let a0(k−1) represent the state of the surviving path at time k−1 that ends at time k+1 in state 0.

Let a1(k−1) represent the state of the surviving path at time k−1 that ends at time k+1 in state 1.

Let y(k) denote the received noisy samples after averaging, such as the average of two samples received from FIR filter 48 at output path 49, at time k.

Let m0(k) represent the path metric of state 0 at time k.

Let m1(k) represent the path metric of state 1 at time k.
Let m(k)=m0(k)−m1(k). This is the difference metric.

The decoding algorithm for the difference-metric detector may be expressed in a pseudo-code as follows:

```
if (m(k − 1) − 2y(k) >1) then
    {m(k − 1) = 4y(k + 1) − 2y(k) − 1;
     a0(k − 1) = a1(k − 1) = 1;
     /* both paths merge to state 1 */
    }
else if (m(k − 1) − 2y(k) < −1 then
    {m(k + 1) = 4y(k + 1) − 2y(k) + 1;
     a0(k − 1) = a1(k − 1) = 0;
     /* both paths merge to state 0 */
    }
else
    {m(k + 1) = −m(k − 1) + 4y(k + 1);
     a0(k − 1) = 1;
     a1(k − 1) = 0
     /* the paths do not merge */
    }
```

Figure 8B:
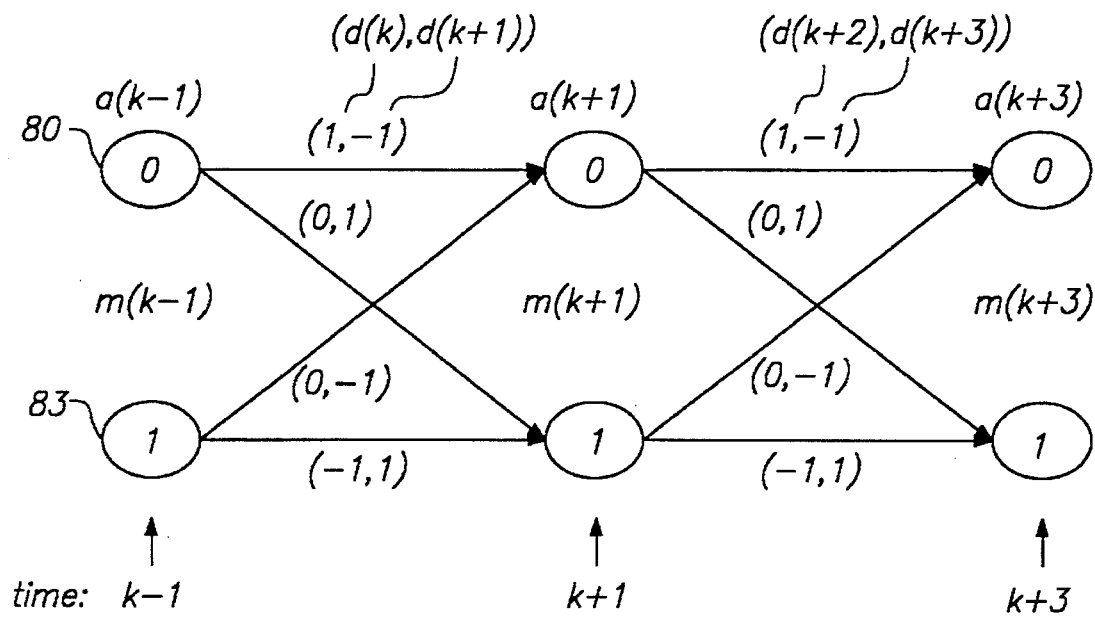
FIG. 8B is a simplification of the diagram of FIG. 8A.
Figure 9:
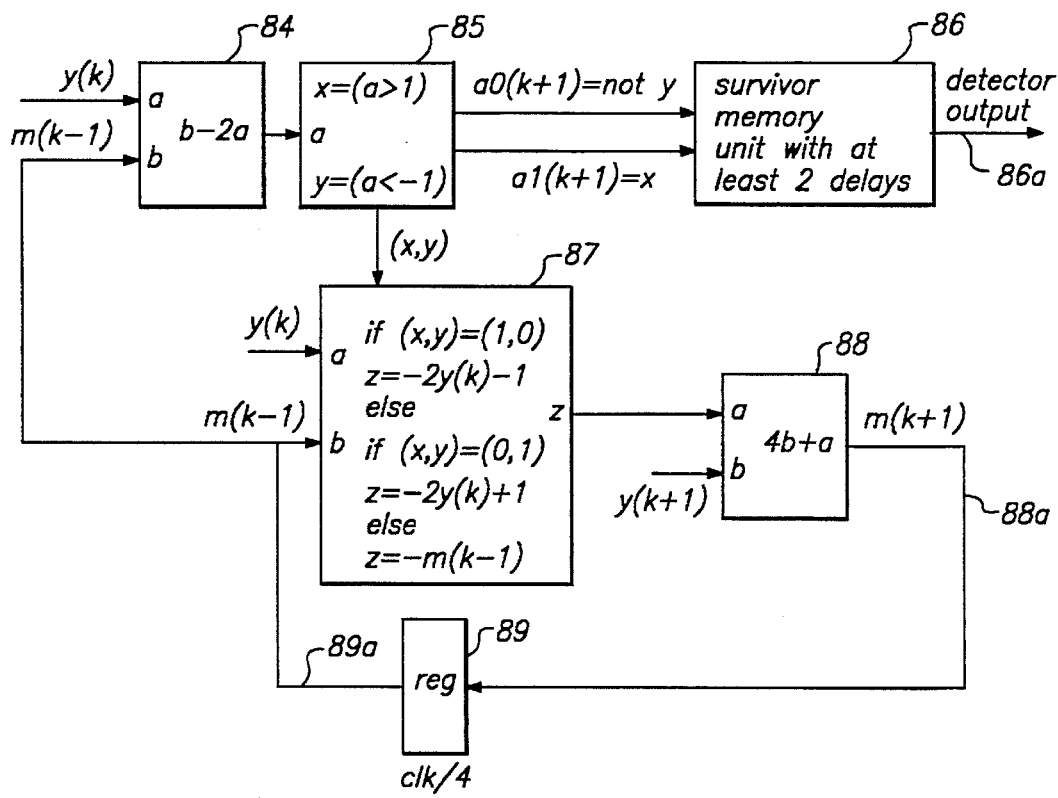
FIG. 9 is a block diagram of a difference-metric Viterbi detector for wide bi-phase codes.

FIG. 9 is a block diagram showing an implementation of the difference-metric Viterbi detector for WBP codes. Block 84 calculates a=m(k−1)−2y(k). At block 85, two logical values 0 and 1 (false and true, respectively) are calculated for x and y, as follows: x=a>1, and y=a<−1. Block 85 also calculates the values a0(k+1) and a1(k+1), which are the states of the surviving paths at time k+1 that end at time k+3 in states 0 and 1, respectively. These are provided to a survivor memory 86, and are calculated as shown in FIG. 8, namely:

$$a0(k+1) = \text{NOT } y, \text{ and}$$

$$a1(k+1) = x.$$

Block 86 implements a standard Viterbi detector survivor memory whose output 86a is the output of the detector. The depth of the survivor memory will be selected to meet the detector's performance requirements; for the uses described here, a depth of at least 1 would generally be sufficient.

A value z for use in the difference metric calculation is calculated in block 87, as follows:

```
if (x,y) = (1,0)      z = −2y(k) − 1;
if (x,y) = (0,1)      z = −2y(k) + 1;
otherwise             z = −m(k − 1).
```

Block 88 uses this calculated value z to output m(k+1), calculated as follows:

$$m(k+1) = 4y(k+1) + z.$$

This output 88a is delayed in register 89 by 4T (a WBP symbol time) and the output 89a of the register is the input value m(k−1) to block 87. (The initial value of m(k−1) at k=0 is 0.)

A second Viterbi detector, which we will call the tree-search detector, for WBP codes will now be described in terms of the states and transitions shown in FIG. 8B. THe tree-search detector must be forced to begin at an initial state, since it is assumed that the two survivor paths merge at time k−1. The surviving paths at time k+1 are then detected from:

a(k−1), which represents the merged surviving path at time k−1, and y(k), Y(k+1), Y(k+2), and Y(k+3), equalized and averaged samples as produced, for example, at output 49 of FIR filter 48.

In the context of servo sector fields the requirement that the tree-search detector start in a known state is reasonable, since the state can be forced, for example, by a known field such as the preamble field 732.

The decoding algorithm for the tree-search detector may be expressed in a pseudo-code as follows:

```
metric1 = y(k) − 2y(k + 1) + y(k + 2)
metric2 = y(k) − 2y(k + 1) + 2y(k + 3);
if (a(k − 1) == 0) then
    a(k + 1) = (metric1 < 0) OR
        ((metric 1 < 1) AND (metric2 < 0.5))
else
    a(k + 1) = (metric1 < −1) OR
        ((metric1 < 0) AND (metric2 < −0.5));
```

As above, in these calculations a logical false is an arithmetic 0, and a logical true, an arithmetic 1.

Figure 10:
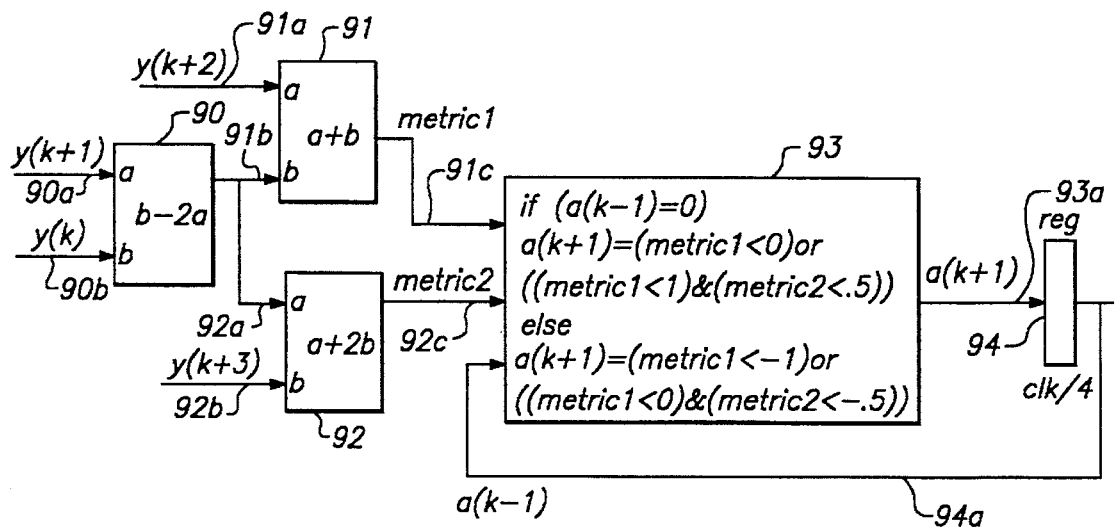
FIG. 10 is a block diagram of a tree-search Viterbi detector for wide bi-phase codes.

FIG. 10 is a block diagram showing an implementation of the tree-search Viterbi detector for WBP codes. Blocks 91 and 92 calculate metric1 and metric2, respectively, as defined above. At inputs 90a and 90b, block 90 receives samples y(k+1) and y(k), respectively, and from them calculates y(k)−2y(k+1). This is provided at inputs 91b of block 91 and 92a of block 92. At input 91a block 91 also receives sample y(k+1) and at input 92b block 92 receives sample y(K+3). Metric 1 is output at path 91c to block 93. Metric2 is output at path 92c to block 93. Block 93 calculates a(k+1), output at path 93a, as set forth in the above pseudo-code, from metric1, metric2, and a(k−1). The output 93a of block 93 is the input to 4T delay register 94, which provides a(k−1) to block 93 on path 94a.

Viterbi Detectors for WBP with EPR4 Targets

Figure 11:
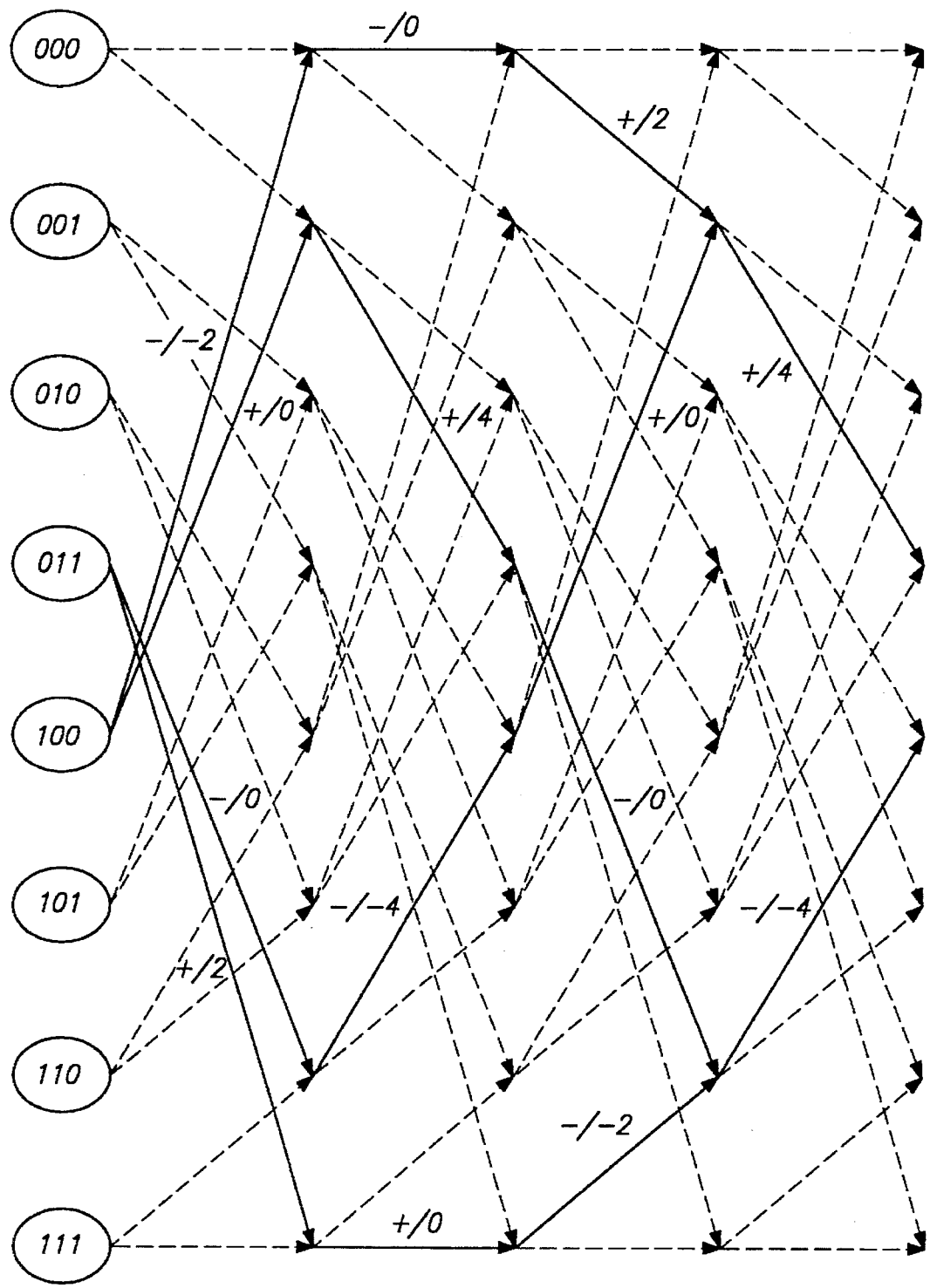
FIG. 11 is a trellis diagram of an EPR4 channel with wide bi-phase paths highlighted.

Turning to FIG. 11, we consider the implementation of a Viterbi detector that detects EPR4 targets that are WBP encoded. The EPR4 target has a pulse response of 1+D−D2−D3. The number of states needed to represent the EPR4 target is 8. FIG. 11 is a trellis diagram of an EPR4 channel with wide bi-phase paths highlighted. This diagram parallels the diagram for a PR4 channel found in FIG. 6, with the difference that there are 8 states and 5 possible sample inputs: −4, −2, 0, 2, and 4.

Figure 12A:
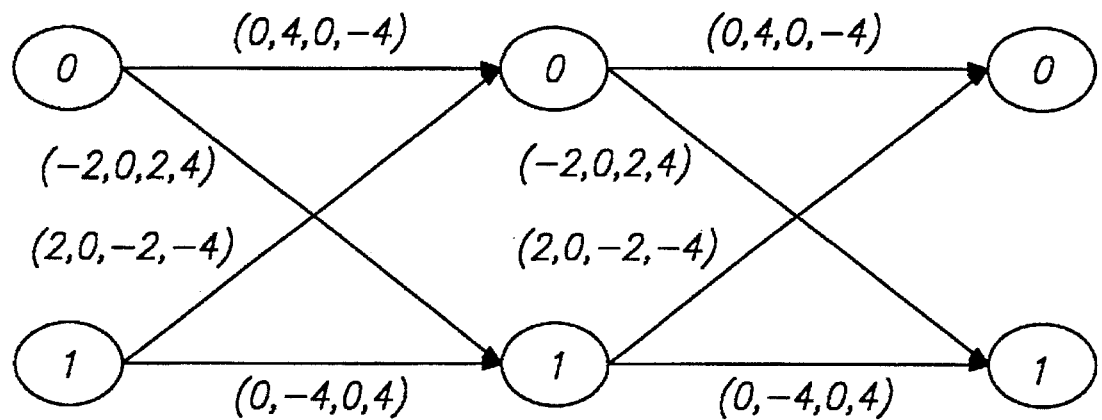
FIG. 12A is a trellis diagram of a wide bi-phase EPR4 channel with four samples taken at a time.

Turning to FIG. 12A, once chunk synchronization is achieved, the EPR4 trellis can be updated 4 samples at a time with only 2 of the states of the original trellis. The original states 100 and 011 are renamed to 0 and 1, respectively, in FIG. 12A, and only the sample values at the Viterbi detector input are shown on the branches. The trellis diagram may be further simplified, as shown in FIG. 12B, by dividing the incoming sample values by 2.

Figure 12B:
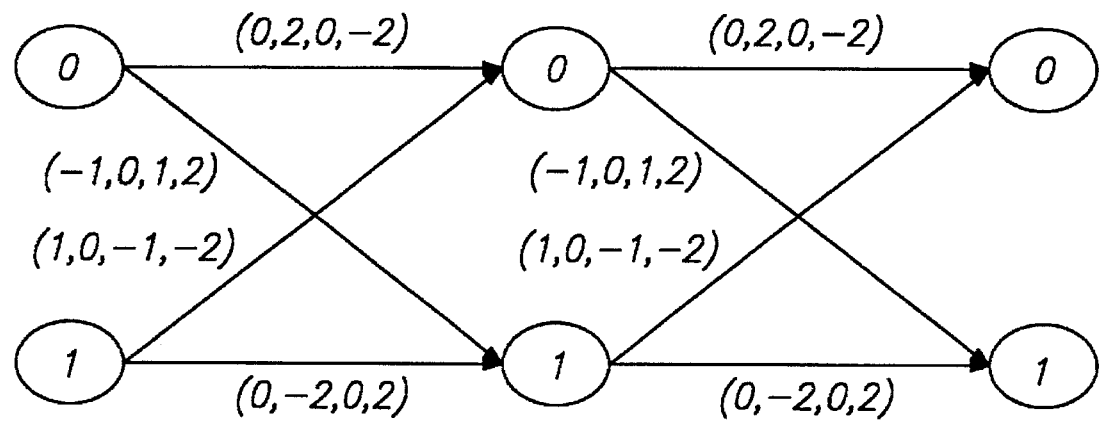
FIG. 12B is a simplification of the block diagram of FIG. 7A.

As with the simplified trellis of FIG. 8B, we now describe two Viterbi detectors, based on FIG. 12B, for WBP codes with EPR4 targets.

The first detector, a difference-metric detector, substantially parallels the difference-metric detector described in connection with FIG. 9.

Let a0(k−1) represent the state of the surviving path at time k−1 that ends at time k+3 in state 0.

Let a1(k−1) represent the state of the surviving path at time k−1 that ends at time k+3 in state 1.

Let y(k) denote the received noisy samples, such as the average of two samples received from FIR filter 48 at output path 49, at time k, after scaling to ideal values −2, −1, 0, 1, and 2.

Let m0(k) represent the path metric of state 0 at time k.

Let M1 (k) represent the path metric of state 1 at time k.

Let $m(k)=m0(k)-m1(k)$. This is the difference metric.

The decoding algorithm for the difference-metric detector may be expressed in a pseudo-code as follows:

```
thr(k - 1) = m(k - 1) - 2y(k - 1) - 4y(k - 2) +
  2y(k - 3);
if (thr(k - 1) > 2) then
  {m(k + 3) = 8y(k) + 2y(k - 1) - 4y(k - 2) - 2y(k - 3)
    -2;
   a0(k - 1) = a1(k - 1) = 1;
   /* both paths merge to state 1 */
  }
else if (thr(k - 1) < -2) then
  {m(k + 3) = 8y(k) + 2y(k - 1) - 4y(k - 2) -
    2y(k - 3) + 2;
   a0(k - 1) = a1(k - 1) = 0;
   /* both paths merge to state 0 */
else
  {m(k + 3) = - m(k - 1) + 8y(k) + 4y(k - 1) -
    4y(k - 3);
   a0(k - 1) = 1;
   a1(k - 1) = 0
   /* the paths do not merge */
  }
```

As with the difference-metric Viterbi detector for WBP with PR4 targets, a survivor memory depth of 3 would generally be sufficient for the uses described here.

The second, tee-search Viterbi detector for WBP codes with EPR4 targets will now be described. In describing the tree-search detector, it is assumed that the two survivor paths merge at time k–1. The surviving paths at time k+3 are then detected from:

a(k–1), which represents the merged surviving path at time k–1; and y(k), y(k–1) . . . y(k–7), equalized and averaged samples as produced, for example, as the output of 1+D filter 50.

The decoding algorithm for the tree-search detector may be expressed in a pseudo-code as follows:

```
metric1 = 2y(k - 1) + 4y(k - 2) - 2y(k - 3) -
  8y(k - 4) - 2y(k - 5) + 4y(k - 6) + 2y(k - 7);
metric2 = 8y(k) - 4y(k - 1) + 4y(k - 3) - 8y(k - 4) -
  2y(k - 5) + 4y(k - 6) + 2y(k - 7);
if (a(k - 1) == 0) then
  a(k + 3) =(metric1 < 0) OR
    ((metric1 < 4) AND (metric2 < 2))
else
  a(k - 3) = (metric1 < -4) OR
    ((metric1 < 0) AND (metric2 < -2));
```

As with the tree-search detector for WBP with PR4 targets, this detector for EPR4 targets has no survivor memory.

Returning to FIG. 1, a Viterbi detector 60 for PRML detection of WBP codes with EPR4 targets can be used to detect all WBP-encoded digital information in the servo sector, such as track number, head number, and sector number. Viterbi detector 60 may be a difference-metric detector or a tree search detector, as described above in connection with FIGS. 11, 12A, and 12B, or a conventional Viterbi detector. Alternatively, in place of an EPR4 detector, WBP-encoded data in the servo sector may be decoded by a Viterbi detector for WBP codes with PR4 targets, such as the difference-metric detector or the tree-search detector described above in connection with FIGS. 7, 8A, 8B, 9, and 10, or by a conventional Viterbi detector.

In FIG. 1 a digital servo burst detector 54 also receives the EPR4 target output signal from 1+D filter 50. Alternatively, burst detector 54 may receive a PR4 target from FIR filter 48, where burst formats are used that can be detected with a PR4 target.

Turning to FIG. 13A–13E, five servo burst formats will be described. The centers of the data tracks are indicated by TK0, TK1, TK2, and TK3. The bursts in each format repeat with a period of two tracks. The first format, which we will call the type I format, i.e. full track bursts, is illustrated diagrammatically in FIG. 13A. The type I bursts A, B, and C (and, optionally, D) are written to be the width of a data track. Because the write head is less than this wide, the bursts are written in at least two passes and at least one erase band (not shown) will be found within each burst. There is also an erase band (not shown), for example, between burst A and burst C, that runs along TK1.

Figure 13A:
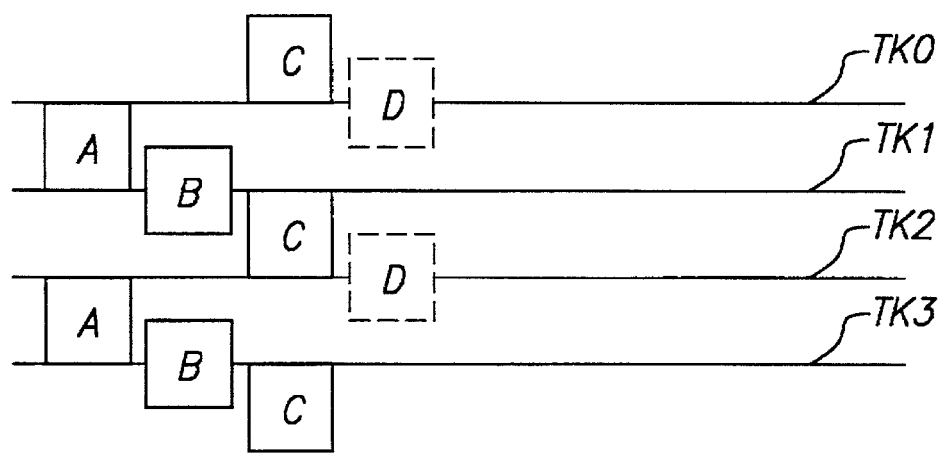
FIGS. 13A–13E are diagrams illustrating servo bursts formats.
Figure 13B:
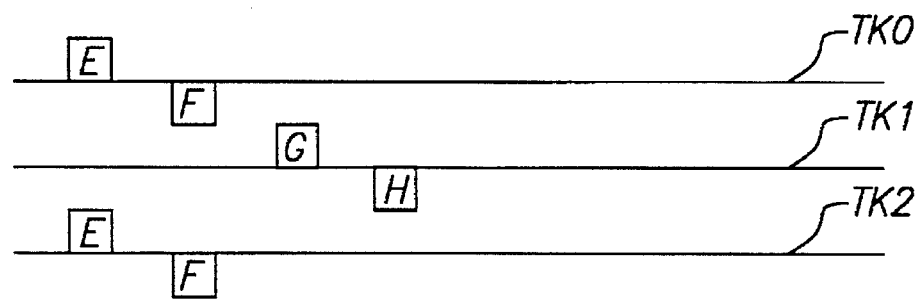

The second format, which we will call the type II format, i.e. narrow bursts, is illustrated diagrammatically in FIG. 13B. In this format, each burst, E, F, G, and H, is written only once; thus there is no erase band within the burst. The distance between radially adjacent bursts (such as E and F) is half a track width. The write head will generally exceed this width, so each burst will normally extend over one track center.

In both type I and type II formats, the bursts themselves are normally sinusoids of constant frequency and amplitude.

Figure 13C:
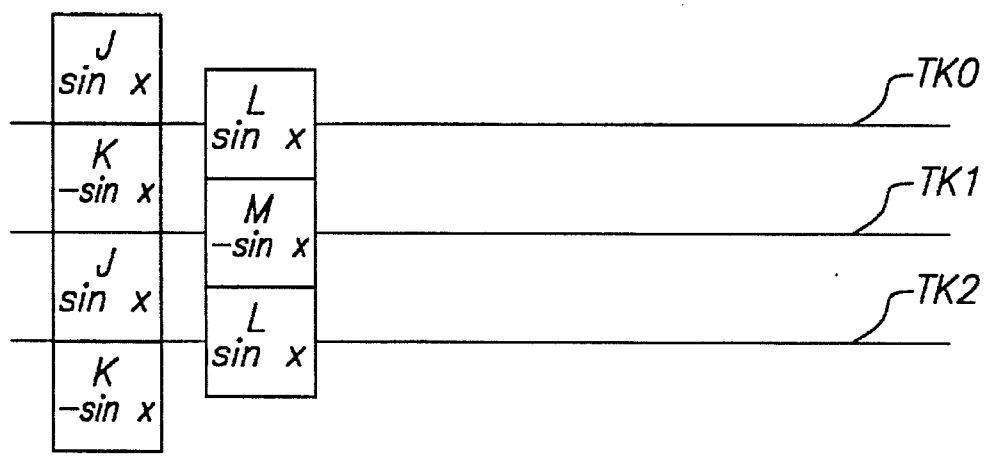

The third format, which we will call the antipodal format, is illustrated diagrammatically in FIG. 13C. In this format, the bursts—J, K, L, and M—are written to fill the space left blank, for example, between the A and B bursts in the type I format (FIG. 13A). The unrecorded areas are filled with a sinusoidal waveform of opposite (or antipodal) polarity. Thus, if the signal in burst J is sin(x), the signal in burst K is –sin(x). The waveforms in bursts L and M correspond to those of bursts J and K.

Unlike the situation with type I and type II, phase information is important in the antipodal format. Thus, the PLL is locked while reading this burst format, so as not to "correct" the phase information. For the same reason, this format is subject to errors arising from the erase band within the bursts, radial phase incoherence, and accumulated phase error. To allow the disk drive to limit the effect of such errors, an optional resynchronization pattern (not shown) may be recorded before bursts themselves.

Figure 13D:
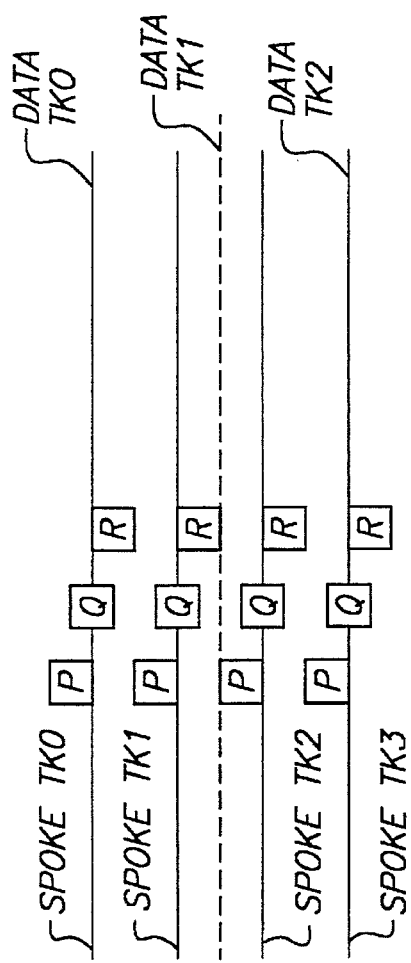

The fourth format, which we will call the compressed format, is illustrated diagrammatically in FIG. 13D. This format is like type I in form, with the difference that, unlike the situation with the other formats, in compressed format the servo information is written on spoke tracks SPOKE TK0, SPOKE TK1, SPOKE TK2, and SPOKE TK3 that do not correspond to the data tracks, which here are denoted DATA TK0, DATA TK1, and DATA TK2. Each burst P, Q, and R is written only once; thus there is no erase band within the bursts and the bursts are nevertheless the full width of the servo track. Note that with this format, in tracking an odd numbered data track, such as track DATA TK1, the disk drive will not be following a servo track center. In fact, the head will ideally be placed exactly between two servo tracks, and the two-track periodicity of the burst format must be used to resolve the track number ambiguity between the Gray coded numbers received from spoke tracks SPOKE TK1 and SPOKE TK2 while tracking data track DATA TK1, for example.

Figure 13E:
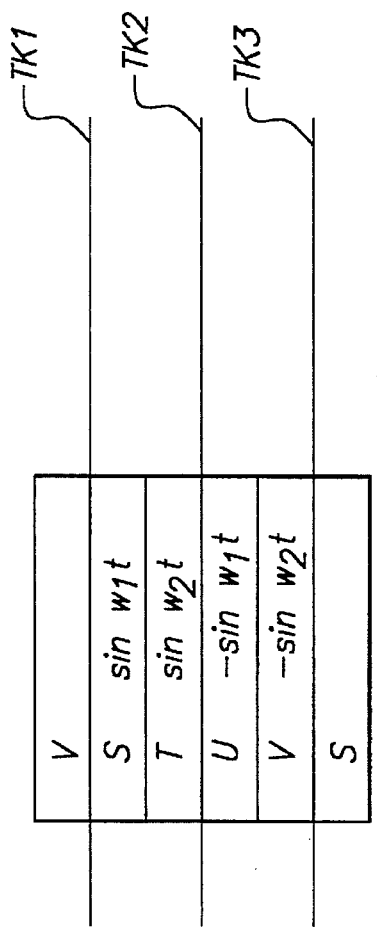

The fifth format, which we will call the frequency format, is illustrated diagrammatically in FIG. 13E. In this format, unlike the ones previously described, the burst waveforms are not all recorded at one frequency. As with the antipodal format, frequency format bursts are recorded across the full radial width of the half tracks. As illustrated in FIG. 14E, the radial sequence of bursts S, T, U, and V are recorded as sinusoids with angular frequencies w1 and w2, so that the form of the sequence of bursts is: S is sinw1t; T is sintw2; U is −sinw1t, and V is −sinw2t. The two frequencies must be different and should be selected to have no intersecting harmonics.

Figure 14A:
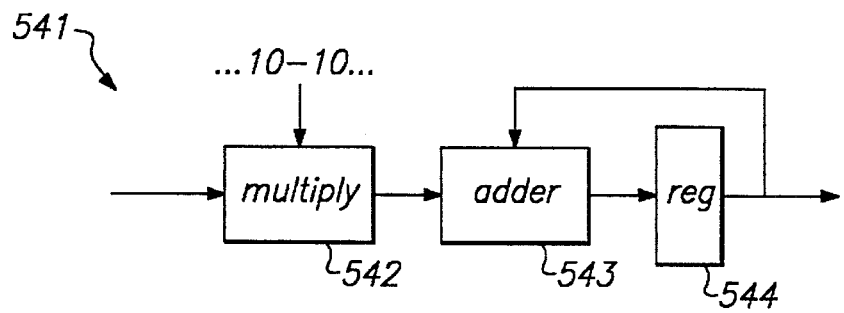
FIGS. 14A–14B are block diagrams of servo burst detectors.
Figure 14B:
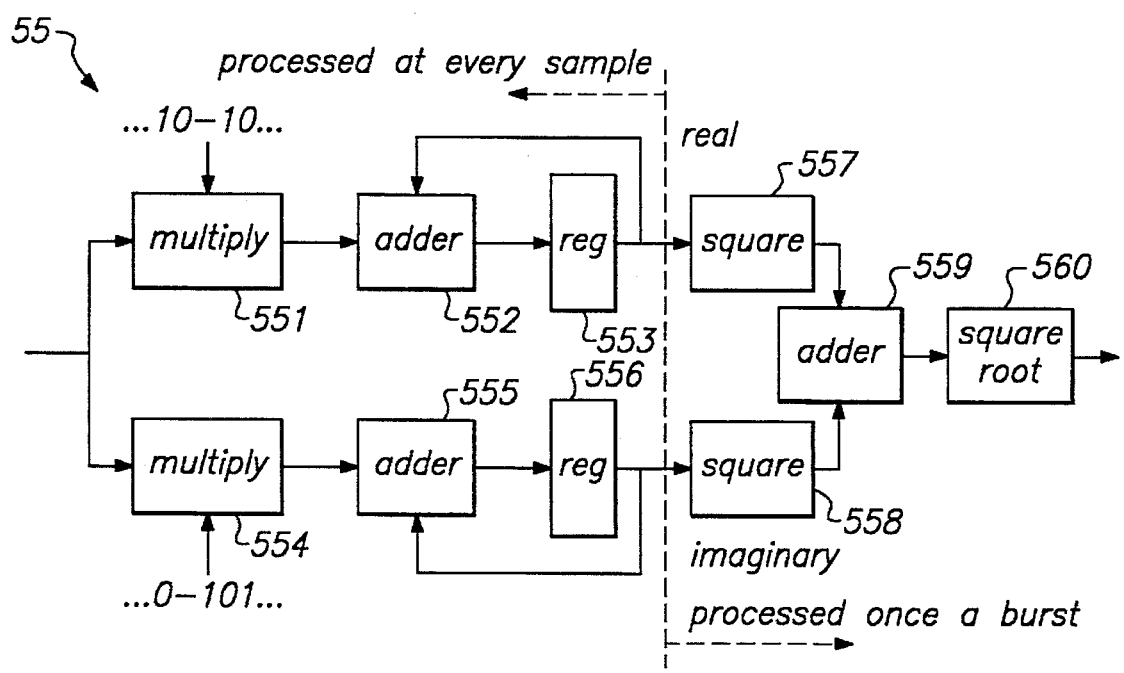

Turning to FIGS. 14A–14B, burst detector 54 will take different forms depending on the format in which the servo bursts are recorded. Turning to FIG. 14A, burst detector 541 is useful for synchronous formats such as the antipodal format and the frequency format. Multiplier 542 multiplies the EPR4 sample waveforms by a sine wave 1 0 −1 0. The result is accumulated by adder 543 in register 544. The output of the detector from register 544 represents the signed amplitude of the (generally) composite signal produced by two radially adjacent bursts, such as bursts K and J of FIG. 13C. This output will ideally be zero when the read head is exactly between the two bursts and on, for example, the track TK1.

Turning to FIG. 14B, burst detector 55 is useful non-synchronous burst formats such as the type I, the type II, and the compressed formats. Burst detector 55 calculates an phase-amplitude vector of the burst signal by multiplying the EPR4 sample waveforms by two orthogonal sine waves with a phase offset of 90°; the first sine wave 1 0 −1 0 is used in multiplier 551, adder 552, and accumulating register 553; the second, orthogonal, sine wave 0 −1 0 1 is used in multiplier 554, adder 555, and accumulating register 556. The result of this process is a phase-amplitude vector whose real part is in register 553 and whose imaginary art is in register 556. When the burst has been read, the energy of the burst is calculated as the square root, circuit 560 of the sum, adder 559, of the squares of the real part, circuit 557, and the imaginary part, circuit 558, of the phase-amplitude vector. This calculated energy estimates the degree of overlap between the burst and the read head and is used later to estimate the head position with respect to the repeating two-track burst pattern. (Note than in the non-synchronous type I, type II, and compressed burst formats under consideration, no two bursts are radially adjacent, so the burst detector will have only one burst to process at a time.)

Two alternative burst detectors for the frequency format will now be described. The first alternative operates as a pair of the burst detectors 541 illustrated in FIG. 14A. The sine wave input to the first detector of the pair has as input to multiplier 542 a sine wave with an angular frequency of w1; the sine wave input to the second detector's multiplier 542 has an angular frequency of w2. The output of each detector is the signed amplitude of the burst signal at the corresponding angular frequency, and these signed amplitudes are compared to estimate the position of the read head.

The second alternative burst detector for the frequency format, unlike the first alternative just described, is not sensitive to radial phase incoherence or phase error. The second alternative duplicates the operation of a pair of the burst detectors 55 illustrated in FIG. 14B. The sine wave input to multipliers 551 and 554 in the first of the pair of detectors has an angular frequency of w1; the sine wave inputs for the second detector's multipliers 551 and 554 have an angular frequency of w2. The outputs of the two detectors, each of which estimate the signed amplitude of the burst signal at the corresponding frequency, are compared to estimate the position of the read head.

A further alternative burst detector and associated synchronous servo burst pattern is described in the referenced U.S. patent application Ser. No. 08/320,540 filed Oct. 12, 1994, by Fisher et al., entitled: "Synchronous Detection of Concurrent Servo Bursts for Fine Head Position in Disk Drive" now U.S. Pat. No. 5,576,906, the disclosure thereof being incorporated herein by reference.

Having thus described presently preferred embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A disk drive comprising:

at least one rotating data storage disk, the disk having a major surface defining recording tracks divided into data sectors by narrow servo spokes, a data sector of a recording track for recording with user data encoded in accordance with a code having a predetermined distance and user data code rate, a servo spoke of the recording area having at least one servo information field coded in a wide biphase pattern at a servo code rate which is one fourth the user data code rate, a synchronous sampling data detection channel including:
  a data transducer head positioned by a servo-controlled actuator over the recording track,
  a preamplifier for receiving electrical analog signals magnetically induced by the data transducer head from flux transitions present in at least the servo information field,
  a digital sampler for synchronously sampling the preamplified electrical analog signals to produce digital samples,
  a user data detector coupled to receive digital samples from the digital sampler for detecting user data encoded in accordance with the code having a predetermined distance and user data code rate, and a servo spoke Viterbi detector coupled to receive digital samples from the digital sampler for decoding the coded wide biphase pattern as a maximum likelihood servo data sequence.

2. The disk drive set forth in claim 1 wherein the servo spoke Viterbi detector comprises a difference metric detector.

3. The disk drive set forth in claim 2 wherein the difference metric Viterbi detector comprises:

a difference circuit connected to subtract two times a present wide biphase encoded servo information sample received from the channel from a difference metric to produce a difference value, a first calculator connected to receive the difference value for calculating a plurality of logical values, for calculating a first state of surviving path, and for calculating a state of a second surviving path, a survivor memory unit connected to the first calculator to receive the first and second states and having a predetermined path length for putting out detected servo information, a difference metric calculator connected to the first calculator to receive the plurality of logical values, the difference metric and the present sample, for calculating a present difference metric value, and a delay register for receiving and delaying the present difference metric value by a wide biphase clock interval to produce the difference metric.

4. The disk drive set forth in claim 2 wherein the difference metric Viterbi detector comprises:
 a difference circuit connected to subtract two times a present wide biphase encoded servo information sample y(k) received from the channel from a difference metric m(k−1) to produce a difference value a,
 a first calculator connected to receive the difference value a for calculating logical values 0 and 1 for x and y, in accordance with x=a>1 and y=a<1 and for calculating a state of surviving path at time K+1 that ends at time k+3 in state 0 as a0(k+1)=NOT y, and for calculating a state of surviving path at time k+1 that ends at time k+3 in state 1 as a1(k+1)=x,
 a survivor memory unit connected to the first calculator to receive states a0(k+1) and a1(k+1) and having a predetermined path length for putting out detected servo information,
 a raw difference metric calculator connected to the first calculator to receive x and y, and connected to receive the difference metric m(k−1) and the present sample y(k) for calculating a raw difference metric z in accordance with:

| | |
|---|---|
| if (x,y) == (1,0), then | z = −2y(k) − 1; |
| if (x,y) == (0,1), then | z = −2y(k) + 1; |
| otherwise | z = −m(k − 1), | an intermediate difference metric calculator connected to receive the raw difference metric z and to receive a time adjusted sample y(k+1) for calculating a present difference metric m(k+1)=4y(k+1)+z, and
 a delay register for receiving and delaying the present difference metric m(k+1) by a wide biphase clock interval to produce the difference metric m(k−1).

5. The disk drive set forth in claim 4 wherein the synchronous sampling data detection channel includes a finite impulse response filter adjusted to a partial response, class IV, target spectrum and wherein the difference circuit is connected to receive equalized digital samples from an output of the finite impulse response filter.

6. The disk drive set forth in claim 2 wherein the channel is equalized to an EPR4 target spectrum, and wherein the Viterbi detector detects the wide biphase encoded servo information in accordance with

```
thr(k − 1) = m(k − 1) − 2y(k − 1) − 4y(k − 2) + 2y(k − 3);
if (thr(k − 1) > 2) then
  {m(k + 3) = 8y(k) + 2y(k − 1) − 4y(k − 2) − 2y(k − 3)
  −2;
   a0(k − 1) = a1(k − 1) = 1;
  /* both paths merge to state 1*/
  }
else if (thr(k − 1) < −2) then
  {m(k + 3) = 8y(k) + 2y(k − 1) − 4y(k − 2) −
  2y(k − 3) + 2;
   a0(k − 1) = a1(k − 1) = 0;
  /* both paths merge to state 0 */
else
  {m(k + 3) = −m(k − 1) + 8y(k) + 4y(k − 1) − 4y(k − 3);
   a0(k − 1) = 1;
   a1(k − 1) = 0
  /* the paths do not merge */
  },
``` where a0(k−1) represents a state of a surviving path at time k−1 that ends at time k+3 in a state 0; a1(k−1) represents a state of a surviving path at time k−1 that ends at a time k+3 in a state 1; y(k) denotes a received noisy samples, such as the average of two samples at time k, after having been scaled to ideal values −2, −1, 0, 1, and 2; m0(k) represents a path metric of state 0 at time k; M1(k) represents a path metric of state 1 at time k; and, m(k)=m0(k)−m1(k), the difference metric.

7. The disk drive set forth in claim 1 wherein the servo spoke Viterbi detector is a tree-search detector.

8. The disk drive set forth in claim 7 wherein the tree-search detector comprises:
 a difference circuit connected to the channel to receive and subtract two times a one unit time adjusted wide biphase encoded servo information sample y(k+1) from a present sample y(k) to produce a difference value a,
 a first metric calculator connected to receive the difference value a and a two-unit time adjusted sample y(k+2) for calculating and putting out a first metric1= y(k)−2y(k+1)+y(k+2),
 a second metric calculator connected to receive the difference value a and a three-unit time adjusted sample y(k+3) for calculating and putting out a second metric2=y(k)−2y(k+1)+2y(k+3), and
 a tree-search calculator for receiving the metric1, metric2 and a detector output value a(k−1), for calculating an intermediate value a(k+1) in accordance with:
 if (a(k−1)=0), then
  a(k+1)=(metric1<0) OR
  ((metric1<1) & (metric2<0.5)),
 else
  a(k+1)=(metric1<1) or
  ((metric1<0) & (metric2<−0.5)), and
 a delay register for receiving and delaying the intermediate value a(k+1) by a wide biphase clock interval to produce the detector output value a(k−1).

9. The disk drive set forth in claim 7 wherein the synchronous sampling data detection channel includes a finite impulse response filter adjusted to a partial response, class IV, target spectrum and wherein the difference circuit is connected to receive equalized digital samples from an output of the finite impulse response filter.

10. The disk drive set forth in claim 1 wherein the synchronous sampling data detection channel includes a finite impulse response filter for filtering digital samples in accordance with a $1-D^2$ pulse response (partial response, class IV) where D represents a one bit cell delay, and a 1+D filter connected downstream of the finite impulse response filter to provide digital samples filtered in accordance with a $1+D-D^2-D^3$ pulse response (EPR4), and wherein the servo spoke Viterbi detector is connected to receive EPR4 equalized wide biphase samples from an output of the 1+D filter.

11. The disk drive set forth in claim 10 wherein the servo spoke Viterbi detector detects surviving paths at a time k+3 in accordance with steps comprising:
 metric1=2y(k−1)+4y(k−2)−2y(k−3)−8y(k−4)−2y(k−5)+ 4y(k−6)+2y(k−7);
 metric2=8y(k)−4y(k−1)+4y(k−3)−8y(k−4)−2y(k−5) +4y(k−6)+2y(k−7);
 if (a(k−1)==0) then
  a(k+3)=(metric1<0) OR
   ((metric1<4) AND (metric2<2))
 else
  a(k−3)=(metric1<−4) OR
   ((metric1<0) AND (metric2<−2));
where a(k−1), which represents the merged surviving path at time k−1; and y(k), y(k−1) y(k−7), represent equalized and averaged wide biphase encoded servo information samples.

12. The disk drive set forth in claim 1 wherein the servo spoke includes plural servo information fields encoded in wide biphase.

13. The disk drive set forth in claim 1 wherein the wide biphase magnet patterns recorded in the plural servo information fields are ++−− for a binary zero information value and −−++ for a binary one information value.

14. The disk drive set forth in claim 13 wherein one of the plural servo information fields comprises a servo address mark pattern.

15. The disk drive set forth in claim 14 wherein the servo address mark pattern is a nine-symbol word 000100101 (binary) for marking the beginning of a servo block.

16. The disk drive set forth in claim 1 wherein the at least one servo information field comprises a track number binary pattern of predetermined bit length, the pattern being decoded as a wide biphase code and then decoded as a Gray code with a code rate of one.

17. The disk drive set forth in claim 16 wherein the track number binary pattern includes a parity symbol, and further comprising means for receiving and decoding the track number binary pattern and checking the parity symbol.

18. The disk drive set forth in claim 1 wherein the at least one servo information field comprises two track number binary patterns of predetermined bit length, a first track number being an address of the track, and a second track number being an address of a second track adjacent the track.

19. The disk drive set forth in claim 18 wherein the second track number is recorded with a one-half track offset extending into the second track.

20. The disk drive set forth in claim 19 wherein the at least one servo information field further comprises error correction code values calculated with respect to the first and second track numbers, and further comprising error correction code decoding and correcting circuitry coupled to the synchronous sampling data detection channel for decoding, checking and correcting the decoded values of the first and second track numbers.

21. A disk drive comprising:
at least one rotating data storage disk, the disk having a major surface defining recording tracks divided into data sectors by narrow servo spokes,
a data sector of a recording track for recording with user data encoded in accordance with a code having a predetermined distance and user data code rate,
a servo spoke of the recording area having at least one preamble field and at least one servo information field coded in a wide biphase pattern at a servo code rate which is one fourth the user data code rate, a synchronous sampling data detection channel including:
a data transducer head positioned by a servo-controlled actuator over the recording track,
a preamplifier for receiving electrical analog signals magnetically induced by the data transducer head from flux transitions present in at least the servo information field,
a digital sampler for synchronously sampling the electrical analog signals to produce digital samples,
a partial response filter for filtering the digital samples to a partial response class IV target spectrum to produce PR4 samples,
a 1+D filter, D being a unit delay operator, connected to filter the PR4 samples to EPR4 target samples, and
a wide biphase Viterbi detector connected to receive and decode the EPR4 target samples taken from the servo information field as most likely servo information binary values.

22. A difference metric Viterbi detector for detecting wide biphase encoded servo information within a partial response, class IV, synchronous sampling data detection channel, the detector comprising:

a difference circuit connected to subtract two times a present wide biphase encoded servo information sample y(k) received from the channel from a difference metric m(k−1) to produce a difference value a, a first calculator connected to receive the difference value a for calculating logical values 0 and 1 for x and y, in accordance with x=a>1 and y=a<1 and for calculating a state of surviving path at time K+1 that ends at time k+3 in state 0 as a0(k+1)=NOT y, and for calculating a state of surviving path at time k+1 that ends at time k+3 in state 1 as a1(k+1)=x, a survivor memory unit connected to the first calculator to receive states a0(k+1) and a1(k+1) and having a predetermined path length for putting out detected servo information, a raw difference metric calculator connected to the first calculator to receive x and y, and connected to receive the difference metric m(k−1) and the present sample y(k) for calculating a raw difference metric z in accordance with:

| | |
|---|---|
| if (x,y) = (1,0), then | z = −2y(k) − 1, |
| if (x,y) = (0,1), then | z = −2y(k) + 1, |
| otherwise | z = − m(k−1), | an intermediate difference metric calculator connected to receive the raw difference metric z and to receive a time adjusted sample y(k+1) for calculating a present difference metric m(k+1)=4y(k+1)+z, and a delay register for receiving and delaying the present difference metric m(k+1) by a wide biphase clock interval to produce the difference metric m(k−1).

23. The difference metric Viterbi detector set forth in claim 22 wherein the channel includes a finite impulse response filter adjusted to a partial response, class IV, target spectrum and wherein the difference circuit is connected to receive samples from an output of the finite impulse response filter.

24. A tree-search Viterbi detector for detecting wide biphase encoded servo information within a partial response, class IV, synchronous sampling data detection channel, the detector comprising:

a difference circuit connected to the channel to receive and subtract two times a one unit time adjusted wide biphase encoded servo information sample y(k+1) from a present sample y(k) to produce a difference value a, a first metric calculator connected to receive the difference value a and a two-unit time adjusted sample y(k+2) for calculating and putting out a first metric1= y(k)−2y(k+1)+y(k+2), a second metric calculator connected to receive the difference value a and a three-unit time adjusted sample y(k+3) for calculating and putting out a second metric2=y(k)−2y(k+1)+2y(k+3), and a tree-search calculator for receiving the metric1, metric2 and a detector output value a(k−1), for calculating an intermediate value a(k+1) in accordance with:

```
if (a(k-1) = 0), then
    a(k+1) = (metric 1 < 0) OR
        ((metric1 < 1) & (metric2 < 0.5)),
else
    a(k+1) = (metric1 < 1) or
        ((metric1 <0) & (metric2 < -0.5)), and
``` a delay register for receiving and delaying the intermediate value a(k+1) by a wide biphase clock interval to produce the detector output value a(k−1).

25. The tree-search Viterbi detector set forth in claim 24 wherein the channel includes a finite impulse response filter adjusted to a partial response, class IV, target spectrum and wherein the difference circuit is connected to receive samples from an output of the finite impulse response filter.

26. A difference metric Viterbi detector for detecting wide biphase encoded servo information within a partial response synchronous sampling data detection channel, the detector comprising:

a difference circuit connected to subtract two times a present wide biphase encoded servo information sample received from the channel from a difference metric to produce a difference value, a first calculator connected to receive the difference value for calculating a plurality of logical values, for calculating a first state of surviving path, and for calculating a state of a second surviving path, a survivor memory unit connected to the first calculator to receive the first and second states and having a predetermined path length for putting out detected servo information, a difference metric calculator connected to the first calculator to receive the plurality of logical values, the difference metric and the present sample, for calculating a present difference metric value, and a delay register for receiving and delaying the present difference metric value by a wide biphase clock interval to produce the difference metric.

27. A difference metric Viterbi detector for detecting wide biphase encoded servo information within a partial response synchronous sampling data detection channel equalized to an EPR4 target spectrum, the detector for detecting the wide biphase encoded servo information in accordance with:

```
thr(k-1) = m(k-1) - 2y(k-1) - 4y(k-2) + 2y(k-3);
if ( thr(k-1) > 2 ) then
    { m(k+3) = 8y(k) + 2y(k-1) - 4y(k-2) - 2y(k-3)
        -2;
        a0(k-1) = a1(k-1) = 1;
        /* both paths merge to state 1 */
    }
else if ( thr(k-1) < -2 ) then
    { m(k+3) = 8y(k) + 2y(k-1) - 4y(k-2) - 2y(k-3) + 2;
        a0(k-1) = a1(k-1) = 0;
        /* both paths merge to state 0 */
else
    { m(k+3) = - m(k-1) + 8y(k) + 4y(k-1) - 4y(k-3);
        a0(k-1) = 1;
        a1(k-1) = 0
        /* the paths do not merge */
},
``` where a0(k−1) represents a state of a surviving path at time k−1 that ends at time k+3 in a state 0; a1(k−1) represents a state of a surviving path at time k−1 that ends at a time k+3 in a state 1; y(k) denotes a received noisy samples, such as the average of two samples at time k, after having been scaled to ideal values −2, −1, 0, 1, and 2; m0(k) represents a path metric of state 0 at time k; M1(k) represents a path metric of state 1 at time k; and, m(k)=m0(k)−m1(k), the difference metric.

28. A tree-search Viterbi detector for detecting wide biphase encoded servo information within a partial response synchronous sampling data detection channel equalized to an EPR4 target spectrum, the detector for detecting the wide biphase encoded servo information wherein two survivor paths merge at a time k−1, and wherein surviving paths at a time k+3 are detected in accordance with steps comprising:

```
metric1 = 2y(k-1) + 4y(k-2) - 2y(k-3) - 8y(k-4) - 2y(k-5) +
    4y(k-6) + 2y(k-7);
metric2 = 8y(k) - 4y(k-1) + 4y(k-3) - 8y(k-4) - 2y(k-5) +
    4y(k-6) + 2y(k-7);
if ( a(k-1) == 0 ) then
    a(k+3) = ( metric1 < 0 ) OR
        (( metric1 < 4 ) AND ( metric2 < 2 ))
else
    a(k-3) = ( metric1 < -4 ) OR
        (( metric1 < 0 ) AND ( metric2 < -2 ));
``` where a(k−1), which represents the merged surviving path at time k−1; and y(k), y(k−1) . . . y(k−7), represent equalized and averaged wide biphase encoded servo information samples.

* * * * *